A. WOLLENSAK.
PHOTOGRAPHIC SHUTTER.
APPLICATION FILED FEB. 20, 1917.
1,238,471.
Patented Aug. 28, 1917.
2 SHEETS—SHEET 1.
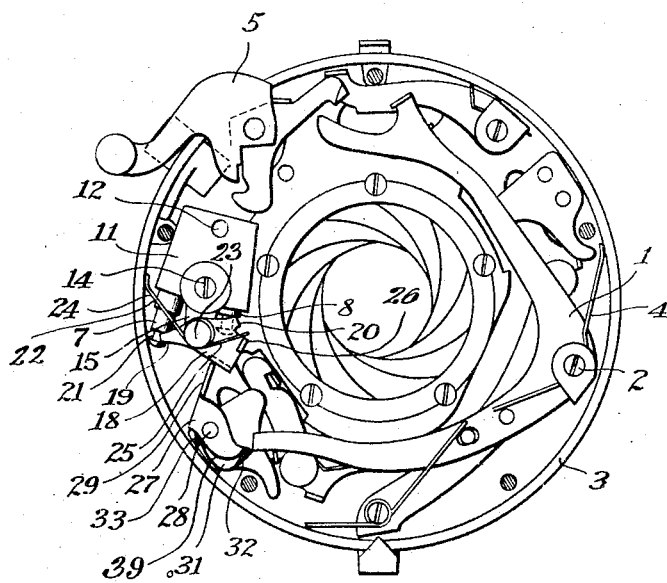
Inventor:
Andrew Wollensak
by Davis & Simms
his attorneys

A. WOLLENSAK.
PHOTOGRAPHIC SHUTTER.
APPLICATION FILED FEB. 20, 1917.

1,238,471.

Patented Aug. 28, 1917.
2 SHEETS—SHEET 2.

Inventor:
Andrew Wollensak
by Davis & Simms
his attorneys

UNITED STATES PATENT OFFICE.

ANDREW WOLLENSAK, OF ROCHESTER, NEW YORK, ASSIGNOR TO WOLLENSAK OPTICAL COMPANY, OF ROCHESTER, NEW YORK, A CORPORATION.

PHOTOGRAPHIC SHUTTER.

1,238,471.   Specification of Letters Patent.   Patented Aug. 28, 1917.

Application filed February 20, 1917.   Serial No. 149,763.

*To all whom it may concern:*

Be it known that I, ANDREW WOLLENSAK, a citizen of the United States, and resident of Rochester, in the county of Monroe and State of New York, have invented certain new and useful Improvements in Photographic Shutters, of which the following is a specification.

The present invention relates to photographic shutters, and more particularly to the type in which a retarding mechanism is employed for variably delaying the action of the shutter, in order that exposures of different durations may be obtained, an object of this invention being to provide a retarding mechanism which will not be affected by different positions of the shutter, due to the use of the latter on cameras of the type which are shifted to either of two positions for taking a vertically elongated picture, or a horizontally elongated picture. A further object of the invention is to provide a retarding mechanism of the dash pot type, in which the movable member of the dash pot is counterbalanced preferably by the movable member of another dash pot, which acts in conjunction with the first named dash pot. Another object of the invention is to provide a retarding mechanism in which the retarding lever is so connected to the dash pot that the weight of the lever is not imposed upon the movable member of the dash pot, thus insuring substantially the same action for any position of the shutter. A still further object is to provide an improved construction in which all parts used in connection with the retarding mechanism may be disconnected from the motor or master member, so that the latter may partake of a quick movement.

To these and other ends, the invention consists of certain parts and combinations of parts all of which will be hereinafter described, the novel features being pointed out in the appended claims.

In the drawings:—

Figure 1 is an interior view of a shutter constructed in accordance with the present invention, the retarding mechanism being illustrated in its retarding position;

Fig. 2 is a view similar to Fig. 1, showing the shutter blades open and the master or motor member about to slip over or be released from the retarding mechanism;

Fig. 5 is a detail perspective view of the retarding lever;

Fig. 6 is a detail perspective view of the block or member in which the plungers of the dash pots operate;

Figure 3:
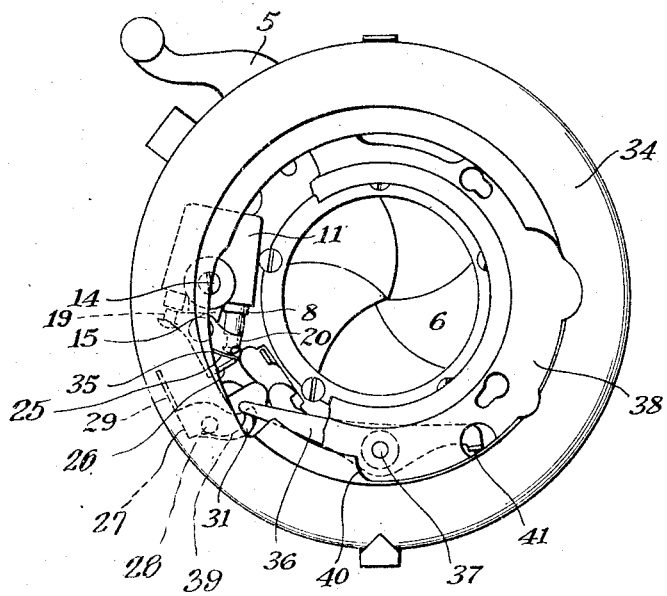
Fig. 3 is a view of the shutter with parts removed to show the control of the retarding mechanism by the controlling ring or member, the latter being illustrated in a position where the retarding mechanism is effective for delaying the action of the shutter blades.

The invention is shown herein as embodied in a photographic shutter of the type illustrated in my Patent #1,214,250, granted January 30, 1917, but it will be understood that the invention is not limited to the type in said patent, but may, within the scope of the appended claims, be embodied in a photographic shutter of any type. For the details of the shutter-operating mechanism illustrated in this application, reference may be had to my former patent hereinbefore mentioned, it being merely necessary to state that the motor or master member 1 is pivoted at 2, within the casing 3, and is shifted in one direction against the action of its spring 4 by an operating member 5, which, when it reaches a certain position, slips off and frees the master member 1 so that the latter moves in the other direction under the action of its spring 4, and effects the opening and the closing of the blades. This master or motor member 1 of the shutter-operating mechanism coöperates with the retarding mechanism forming the subject-matter of the present invention. During the shifting of the motor or master member 1 by means of the operating member 5, the master member passes by or slips over the retarding mechanism, without producing any action in said retarding mechanism, but, if the retarding mechanism has been adjusted to be imposed upon the shutter-operating mechanism, this master member will, upon its return movement under the action of the spring 4, be brought into coöperation with the retarding mechanism, and the latter will delay the movement of the master or motor member 1 of the shutter-operating mechanism to hold the blades 6 in open positions for a length of time determined by the adjustment of the retarding mechanism, after which the motor or master member 1 is freed, and partakes of a further movement to effect the closing of the blades.

The retarding mechanism embodies preferably two retarding devices in the form of two dash pots. In this instance, the movable members 7 and 8 of the dash pots are in the form of pistons which operate in two bores or cylindrical chambers 9 and 10, respectively, said bores or chambers being provided in a single block 11, and having their axes lying at an acute angle to each other. This block may be mounted within the casing 3 on two pins 12, one of which carries a screw and washer 14 to hold the block in place. An extension 15 may be provided on this block, and this extension may have a bearing 16 for coöperation with a bearing 17 on a two-arm lever 18. The arms of this lever 18 are connected to the pistons 7 and 8 preferably by means of depending lugs 19 and 20, respectively, the lugs projecting into annular grooves 21 formed on the pistons 7 and 8. This connection between the retarder lever 18 and the pistons 7 and 8 permits the lever to shift slightly with reference to the pistons when the lever is turned on its pivot 17, and at the same time the weight of the lever on said pistons does not vary for any position to which the shutter, as a whole, may be turned, and consequently said lever does not produce an inaccuracy in the retarding mechanism. Furthermore, owing to the position of this double arm lever, with the movable members of two dash pots connected to such lever on opposite sides of its turning axis, each dash pot acts to counterbalance the other, so that should the shutter be turned upside down, or, in fact, in any position, the action of the retarding mechanism is substantially the same, so that there will be no variations in the retarding mechanism due to the weight of the movable members of the dash pot in one position acting to speed up the retarding mechanism, and in another position acting to slow down said mechanism. This retarding lever 18 is acted upon by a spring 22, which is coiled between its ends about the stud 23, and has one end 24 bearing against the shutter casing 3, and its other end 25 bearing against a lug 26 on the retarding lever. This spring tends to move the retarding lever 18 to a certain position after each actuation of the shutter, and in doing so moves the piston 7 into its chamber 9 and withdraws the piston 8 from the chamber 10.

For the purpose of establishing connection between the retarder lever 18 and the motor or master member 1, an intermediate lever 27 is provided. This lever is pivoted on the stud 28, and has an arm 29 adapted to coöperate with a depending portion 30 on the retarder lever. The arm 29 first coöperates with the portion 30 near the outer end of the latter, and then gradually moves on the portion 30 to approach the pivot of the retarding lever 18 until such time as the retarding action is completed. Coöperation between the intermediate lever 27 and the master or motor member 1 is established by an arm 31 on the lever 27 beveled at 32, in order that the master member may ride over said arm 31 when said master member is moved against the action of its spring 4 by means of the operating member 5. On the return movement of the master member, the latter first effects the opening of the shutter blades and then engages with the arm 31, thereby causing coaction between the arm 29 of the intermediate lever and the portion 30 of the retarding lever and bringing the retarding mechanism into action. After a time, the master member 1 slips off the arm 31 and proceeds under the action of its spring 4 to effect the closing of the shutter blades. The retarding lever 18 returns to normal position under the action of the spring 22, while the intermediate lever returns to normal position under the action of the spring 33.

The duration of the retarding action is determined preferably by a controlling member 34, in this instance in the form of a ring, mounted in the manner shown in my patent of January 30, 1917, before mentioned. This ring has a cam surface 35 on its inner periphery for engagement with the lug 26, the engagement being such that when the ring is turned in one direction it moves the retarder lever 18 against the action of the spring 22 and carries the portion 30 away from the arm 29 of the intermediate lever 27. As a consequence, when the intermediate lever 27 is moved by the master member 1, it must move a distance determined by the cam portion 35, before it engages the retarder lever 18, and, in this way, the time during which the retarding mechanism acts is varied. In fact, by the cam portion 35 of the controlling member 34, the retarding member 18 may be moved to a position where the retarding mechanism will not be imposed upon the shutter-operating mechanism.

Figure 4:
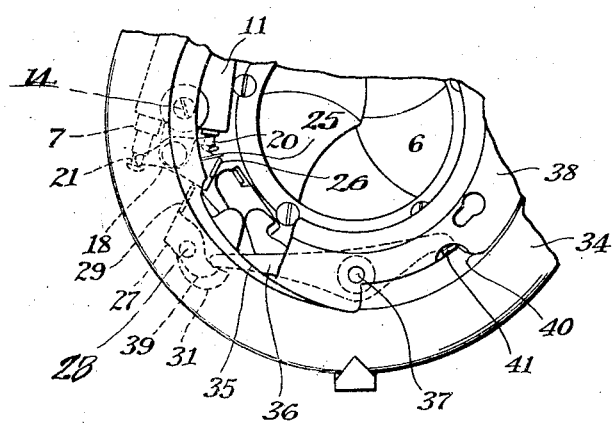
Fig. 4 is a detail view similar to the one shown in Fig. 3, the controlling ring or member being adjusted to throw out all parts of the retarding mechanism.
Figure 7:
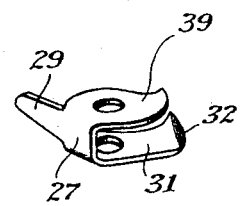
Fig. 7 is a perspective view of an intermediate lever between the master or motor member and the retarding lever.
Figure 8:
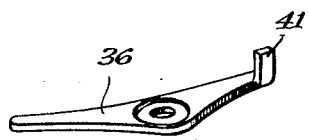
Fig. 8 is a detail perspective view of a lever which coöperates with the controlling ring or member to throw out the intermediate lever illustrated in Fig. 7.

When the retarder lever 18 has been shifted to a position where the retarding mechanism will not be imposed upon the shutter-operating mechanism, it is desirable also that the intermediate lever 27 shall be moved to a position where it will not interfere with the free movement of the master or motor member 1, for it will be apparent that this intermediate lever 27, although small, will, with its spring 33, have a restraining influence on the master or motor member 1, and in this way reduce the speed of said member. To shift the intermediate member out of the path of the motor member 1 a lever 36, pivoted at 37 on the cover plate 38, coöperates with the arm 39 on the intermediate lever 27 to shift said lever to the position shown in Fig. 4, the shifting of the lever 36 being effected preferably by a cam surface 40 on the controlling member 34, engaging with an upstanding lug 41 on the lever 36, the engagement taking place at or about the time that the cam portion 35 moves the retarding lever 18 to a position where the retarding mechanism is ineffective, so that, simultaneously with the throwing out of the retarding mechanism, the intermediate lever 27 is shifted out of the path of the master or motor member 1.

From the foregoing it will be seen that there has been provided a photographic shutter with a retarding mechanism in which the dash pot has its movable member counterbalanced preferably by the movable member of another dash pot, so that the retarding mechanism is not rendered inaccurate by the dash pot when the shutter is shifted to different positions. The retarder lever connects with the movable members of the dash pots in such a manner that the position of the shutter does not cause the weight of the retarder lever to affect the retarding action. The intermediate lever between the master member of the shutter-operating mechanism and the retarder lever is shifted out of connection with the master member substantially simultaneously with the throwing of the retarding mechanism out of connection with the shutter-operating mechanism, so that the intermediate lever is not imposed upon the master member after the retarding lever has been thrown out.

What I claim as my invention and desire to secure by Letters Patent is:—

1. In combination in a photographic shutter; a retarding mechanism embodying a dash pot, means for counterbalancing the movable member of the dash pot, a spring acting on such movable member to return said member to a certain position, and means for varying the return position of said member, under the action of the spring; and a shutter-operating mechanism having a connection with said retarding mechanism which will permit said operating mechanism to move after the retarding action is discontinued.

2. In combination in a photographic shutter; a retarding mechanism embodying two dash pots, connecting means between the movable members of said dash pots causing one to act as a counterbalance for the other, a spring acting to hold said dash pots in the normal positions, means for varying the normal positions of said dash pots to vary the retarding action; and a shutter-operating mechanism having a connection with said retarding mechanism which will permit said operating mechanism to move after the retarding action is discontinued.

3. In combination in a photographic shutter; a retarding mechanism embodying two dash pots, a two-arm lever to which the movable members of said dash pots are connected, a spring acting on such two-arm lever to hold the latter in a certain position, and means for varying the said position of said two-arm lever under the action of the spring; and a shutter-operating mechanism having a connection with the retarding mechanism which will permit said operating mechanism to move after the retarding action is discontinued.

4. In a photographic shutter, a retarding mechanism comprising two dash pots having their movable members arranged to counterbalance each other, and a spring acting on said movable members to hold one of them at one limit of its movement and the other at the opposite limit of its movement.

5. In a photographic shutter, a retarding mechanism comprising two dash pots having their movable members arranged to counterbalance each other, a spring acting on said movable members to hold one of them at one limit of its movement and the other at the opposite limit of its movement, and means for varying the positions of said members under the action of the spring.

6. In combination in a photographic shutter; a retarding mechanism comprising a block having two cylindrical chambers therein with their axes forming an acute angle, two pistons operating in said chambers and each provided with a groove, a two-arm lever having its arm carrying projections working in said grooves, a spring acting to hold one of the pistons in its chamber while withdrawing the other piston, and means for varying the positions of the pistons under the action of the spring; and a shutter-operating mechanism having a connection with said retarding mechanism which will permit said operating mechanism to move after the retarding action is discontinued.

7. In combination in a photographic shutter; a retarding mechanism embodying two dash pots, and a two-arm lever having its arms loosely connected to the movable members of said dash pots, a spring acting to move one of the movable members in one direction and the other movable member in an opposite direction, and means for varying the positions of said members under the action of the spring; and a shutter-operating mechanism having a connection with said retarding mechanism which will permit said operating mechanism to move after the retarding action is discontinued.

8. In combination in a photographic shutter, a shutter-operating mechanism; a retarding mechanism embodying a retarding device, a spring for moving said device in one direction, means for varying the return position of said device under the action of the spring; an intermediate lever between the shutter-operating mechanism and the retarding device with which said shutter-operating mechanism has a slip-off connection to permit the shutter to be closed by the shutter-operating mechanism after the retarding action; a spring for moving said lever to a normal position where it will be engaged by the shutter-operating mechanism while the blades are open; and means for moving the intermediate lever to a position where it will not be engaged by the shutter-operating mechanism, said means becoming effective substantially simultaneously with the rendering of the retarding device ineffective.

ANDREW WOLLENSAK.

Copies of this patent may be obtained for five cents each, by addressing the "Commissioner of Patents, Washington, D. C."